United States Patent

Richter et al.

[15] 3,674,710

[45] July 4, 1972

[54] RANEY MIXED CATALYST

[72] Inventors: Gerhard Richter; Magdalena Kroes; Angelika Frietzsche, all of Erlangen, Germany

[73] Assignee: Siemens Aktiengesellschaft, Berlin, Germany

[22] Filed: May 11, 1970

[21] Appl. No.: 35,950

[30] Foreign Application Priority Data

May 10, 1969 Germany .......................P 19 23 920.4

[52] U.S. Cl. ...........................252/465, 252/477 Q, 75/170
[51] Int. Cl. .............................................B01j 11/32
[58] Field of Search .................252/477 Q, 465; 75/170

[56] References Cited

UNITED STATES PATENTS

2,948,687  8/1960  Hadley.............................252/477 Q

*Primary Examiner*—Daniel E. Wyman
*Assistant Examiner*—W. J. Shine
*Attorney*—Curt M. Avery, Arthur E. Wilfond, Herbert L. Lerner and Daniel J. Tick

[57] ABSTRACT

A Raney mixed catalyst for use as a fuel cell electrode. The catalyst contains nickel, molybdenum and one of the metals titanium or zirconium. The catalyst is prepared from a Raney alloy, which contains aluminum as the inactive component. The alloy is in at least partially homogeneous quarternary phase.

21 Claims, 1 Drawing Figure

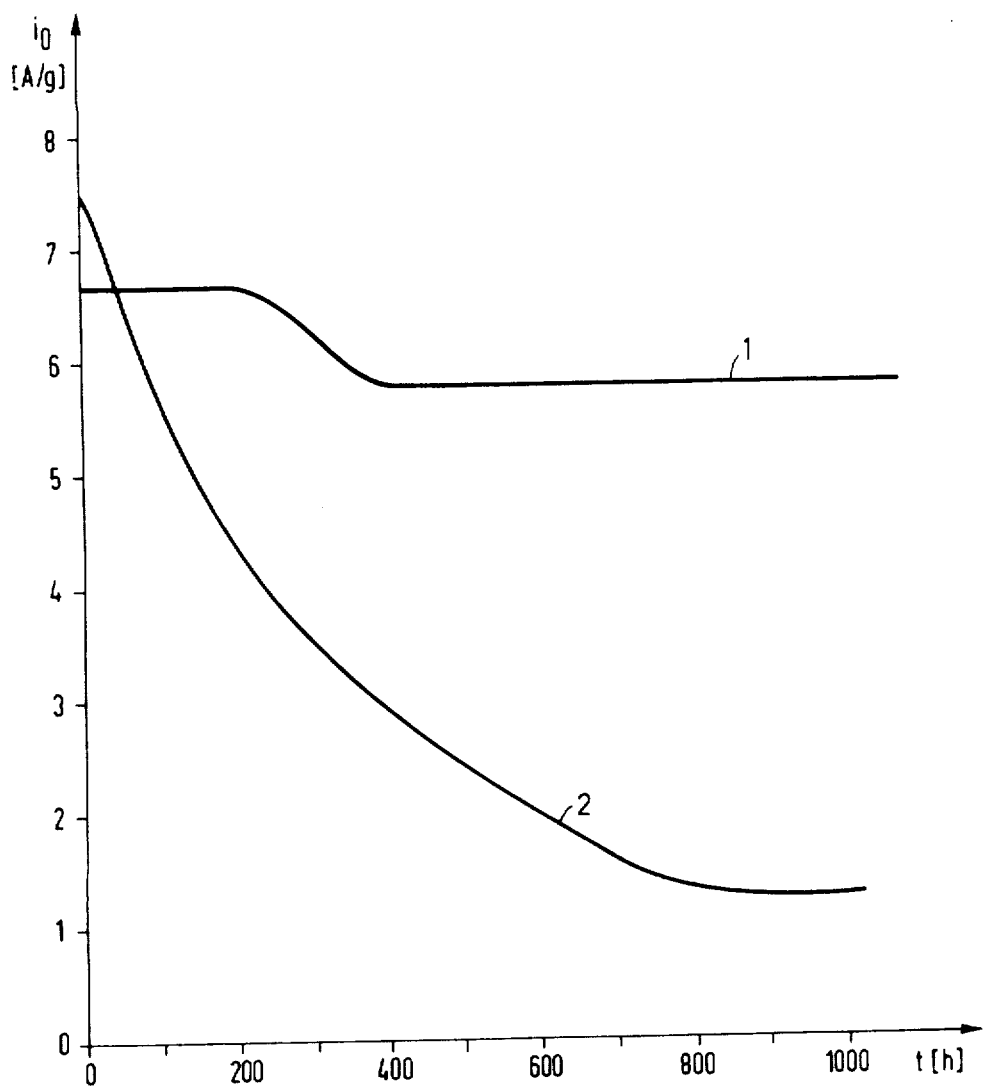

RANEY MIXED CATALYST

It is known to use Raney nickel catalysts for accelerating electrochemical reactions in fuel cells and electrolysts as well as for hydrogenation reactions.

German Pat. No. 1,270,145 teaches increasing the activity of Raney nickel by alloying in another catalytically active metal, such a zirconium and titanium. The catalysts with two active metals, thus produced, are called Raney mixed catalysts. When such Raney catalysts of two catalytically active metals are used as electrode material in fuel elements, it is seen that they do not fully satisfy to their loading capacity and their behavior during continuous operation. The output efficiency of fuel cells must be considerably increased for economical as well as for technical reasons. To this end, it is necessary to improve the loading (charging) capacity of catalysts employed in fuel cells, particularly in catalysts consisting of non-noble metals.

It is an object of our invention to provide a Raney mixed catalyst with increased activity and improved stability.

The new Raney mixed catalyst comprises nickel, molybdenum and one of the metals titanium or zirconium and is prepared from a Raney alloy which contains aluminum as the inactive component and which is completely or partially a homogeneous quarternary phase.

The fact that by alloying in an additional metallic component, the quality of a Raney mixed catalyst is so improved is surprising and could not have been predicted. When nickel-aluminum alloys are compounded with another catalytically active metal, the latter is usually not uniformly distributed in the resulting alloy. Usually, several phases of variable composition, result therefrom. Thus, for example, a Raney alloy consisting of nickel-aluminum and chromium, contains several phases which either comprise nickel and aluminum or chromium and aluminum. If the aluminum is dissolved from the obtained binary phases, by means of an aqueous potassium-hydroxide solution, the result is a mixture of Raney nickel and Raney chromium, whose activity depends from the activity of both Raney metals. Since the Raney chromium has no appreciable activity, the thus produced mixture of Raney catalysts is less active than an equivalent amount of Raney nickel.

Examples of Raney alloys containing ternary homogeneous phases are nickel-iron-aluminum and nickel-molybdenum-aluminum. Raney mixed catalysts produced from such alloys are more active than Raney nickel, Raney iron or Raney molybdenum. Adding molybdenum or iron respectively to the nickel-iron-aluminum or to a nickel-molybdenum-aluminum alloy does not, however, further increase the activity of thus produced catalysts.

Our invention teaches that improved Raney mixed catalyst can possibly be obtained by alloying a third catalytically active metal, when the selected third metal forms a homogeneous, quarternary phase with the inactive component and with the other two active components.

During the fusion of the original components, homogeneous quarternary phases frequently occur in a mixture with other binary and ternary phases, which lead to Raney catalysts of variable activity. The activity of a catalyst, produced from many phases is therefore below the activity of the catalyst from the optimum phase. For this reason, the aim is to produce catalysts from such Raney alloys, which consist completely or overwhelmingly only of one phase containing all alloying components at an optimum ratio. The production of such Raney alloys comprising only one phase is very difficult, however, in three or four component systems. The type and volume composition of the occurring phases is very strongly influenced by the conditions prevailing during the cooling of the melts. Because of this, the activity of Raney mixed catalysts produced of such alloys is hard to reproduce. Moreover, alloys which were too quickly cooled from the melt, tend to corrode when stored in the air for long periods. This results in fine grains which have only a slight activity, after the inactive component has been separated.

According to the invention, the Raney mixed catalyst may consist of 45 to 89.5 percent, preferably 63.5 to 71 percent nickel, 10 to 50 percent, preferably 28.5 to 34.6 percent molybdenum and 0.5 to 5 percent, preferably 1 to 2 percent titanium. All percentages in this application being by weight. According to another embodiment, the Raney mixed catalyst may consist of 44 to 89 percent, preferably 63.3 to 71.2 percent nickel, 10 to 50 percent, preferably 28 to 33.9 percent molybdenum and 1 to 12 percent, preferably 2 to 4 percent zirconium.

Raney catalysts of 69 to 70 percent nickel, 29 percent molybdenum and 1 to 2 percent titanium, respectively 67 to 69 percent nickel, 29 percent molybdenum and 2 to 4 percent zirconium, show a particularly high catalytical effectiveness.

The starting material for such catalysts may be Raney alloys which consist of 48 to 58 percent aluminum, 5 to 25 percent molybdenum, 20 to 45 percent nickel and 0.25 to 2.5 percent titanium or 0.5 to 6 percent zirconium. Preferred are those Raney alloys which consist of at least 70 percent of a homogeneous, quarternary phase. According to the invention, such alloys may comprise 18 to 22 percent molybdenum, 23 to 27 percent nickel, 52 to 56 percent aluminum and 0.5 to 1.0 percent titanium or 18 to 22 percent molybdenum, 23 to 27 percent nickel, 52 to 56 percent aluminum and 1 to 2 zirconium. Only those Raney alloys which consist of the homogeneous, quaternary phase contain, for example, 20.2 percent molybdenum, 24.9 percent nickel, 52.9 percent aluminum and 2 percent zirconium, or 20.4 percent molybdenum, 25.2 percent nickel, 53.4 percent aluminum and 1 percent titanium. The last-indicated alloys provide catalysts of particularly high effectiveness and excellent stability, after separation of the aluminum.

Since these homogenous four-component phases are not formed directly during the cooling process, the alloys must be subjected to an additional tempering process. In the examples, tempering was effected at temperature below 1,110° C. and preferably below 850° C.

To produce mixed catalysts according to the invention, it is advantageous that the Raney mixed catalysts which are formed by separating the inactive component, are "conserved," i.e. oxidized according to one of the known methods. Suitable conservation methods, are particularly the oxidations by air, oxygen or alkalic hydrogen peroxide solution. The pyrophoric character of the Raney mixed catalysts is removed thereby so that the after processed catalysts can be stored in dried condition in air and processed.

An electrochemical oxidation can also result from a polarization of from 100 to 1,000 mV and, preferably, from 100 to 150 mV.

If oxidation takes place in an alkali or basic solution, a portion of the molybdenum contained in the mixed catalyst is dissolved out as the molybdata. This is expedient, since the intermetallic homogeneous phase of 20.4 percent molybdenum, 25.2 percent nickel, 53.4 percent aluminum and 1 percent titanium or 20.2 percent molybdenum, 24.9 percent nickel, 52.9 percent aluminum and 2 percent zirconium, contains more molybdenum than the optimum combination of the catalyst resulting therefrom. In an optimum catalyst, there are four nickel atoms to a molybdenum atom while three to four nickel atoms are available for one molybdenum atom in one catalyst produced of the above-mentioned intermetallic phase. Hence, an after processing provides an increased improvement in the catalyst. Naturally, the excess molybdenum may also be subsequently removed in a different manner, for example through electrochemical oxidation.

The oxidation of the Raney mixed catalysts, however, not only removes the pyrophoric qualities but, at the same time, so stabilizes the activity that Raney catalysts can now be employed for long operational periods in electrodes used in fuel elements or in electrolyzers without a notable impairment of their activity. During the above-mentioned "conserved" oxidation, the chemisorbed hydrogen is first oxidized, followed by the metal surface of the catalyst. Nickel and molybdenum oxides form thereby, as well as titanium dioxide or zirconium dioxide respectively. During the subsequent reactivation of the catalyst by hydrogen or by cathodic prepolarization only the nickel oxides and, possibly, also the molybdenum oxides are reduced. The titanium dioxide or the zirconium dioxide is not reduced under the prevailing conditions.

Therefore, the titanium and zirconium can influence the Raney mixed catalysts from two viewpoints. The interior of the catalyst crystallites contains them in metallic form and as such, they influence the electron band structure of the catalyst and thus its catalytical activity. In the surface layers of the crystallites the titanium and zirconium are present as finely distributed oxide inclusions, following a preceding "conservation" treatment, and contribute toward producing and stabilizing faults and active centers.

Basically, titanium and zirconium may also be replaced by hafnium, niobium and tantalum. Due to their large atom weight, these metals, however, must be employed in much greater quantities, that is approximately 15 and 20 percent. From financial considerations, these metals are not of practical importance.

The improved activity and stability relative to the known, of the new Raney mixed catalysts of three active metals, provides a number of considerable advantages. Thus, for example, the amount of catalyst per cm² electrode area can be considerably reduced. Also, their area loading capacity and the output density may be considerably increased with the aid of the new catalysts. A reduction in stability could not be noted even in the face of great loading.

A pulverulent fuel cell anode operated at room temperature, which, at continuous operation can just about still be loaded with 30 mA/cm², requires approximately 400 mg Raney nickel per cm². If, in place of pure Raney nickel, a Raney mixed catalyst of nickel, molybdenum and titanium or zirconium, is used, the fuel cell anode may be still loaded over long periods and with the same conditions, with 100 mA/cm². As was further shown by testing, the catalyst amount may even be reduced to 50 mg/cm², that is to 12.5 percent of the catalyst amount usually employed without causing a reduction in the loading capacity. A powder electrode with a content of 50 mg/cm² Raney mixed catalyst according to the invention, may even be loaded in continuous operation at 37° C., with 240 mA/cm² and at 60° C. with more than 250 mA/cm². The measured over-loading was around 110 or 100 mV.

The activity of the Raney mixed catalysts according to the invention was measured by determining the specific exchange current. The active catalyst powder, suspended in water, is allowed to deposit on an electrode of gold or platinum, which is located on the bottom of a container. If this catalyst, which is maintained potentiostatically at a potential in the vicinity of the hydrogen potential, is suddenly forced into a potential jump of, for example, 10 mV, the flow current is determined through the oxidation of a portion of the chemisorbed hydrogen. The current drops with the continued reaction of the oxidizing hydrogen. If this current is now extrapolated back to the point of time of the potential jump, the current obtained is just suitable to flow continuously if the consumed hydrogen may be replaced fast enough by a renewed supply. The exchange current is in proportion to the initial current. It corresponds to the initial current at a voltage jump of about 25 mV. The initial current which refers to a weight unit, is called specific exchange current and defines a measure for the activity of the catalyst. For pure Raney nickel, this specific exchange current lies below 1 A/g, at room temperature. By comparison exchange current between 6 and 12 A/g are obtained with the Raney mixed catalysts, according to the invention.

Not only a high activity, but also a high stability is expected of good catalysts. To test the stability of the Raney mixed catalysts according to the invention, the specific exchange current was repeatedly determined whereby the catalysts were maintained at an overvoltage of 120 mV, in intervals between two measuring processes. The altering processes may be considerably accelerated in this manner.

The drawing shows the temporal change in the specific exchange current of electrodes in accord with the invention.

The FIG. shows the temporal change in the specific exchange currents for two catalysts consisting of 84 percent nickel, 15 percent molybdenum and 1 percent titanium. Thus, curve 1 shows the exchange currents of a Raney mixed catalysts, "conserved" following the separation of the aluminum and curve 2 illustrates the exchange currents of a "non-conserved" Raney mixed catalyst. A comparison between the two curves clearly shows that a conserved Raney mixed catalyst, according to the invention, is stable for longer periods, approximately 700 hours and more, at an overvoltage of 120 mV, following a slight loss in activity after 290 hours.

The following table shows the exchange currents, determined at room temperature for 120 mV with Raney nickel and with Raney mixed catalysts. The numbers behind the components indicate percent, with the aluminum concentration of the original alloy was 50 percent, unless otherwise specified. All percentages are by weight, as previously indicated.

| | |
|---|---|
| Raney Nickel | <1 A/g |
| Raney Nickel (99)—Titanium (1) | 2.0 A/g |
| Raney Nickel (80)—Molybdenum (20) | 5.5 A/g |
| Raney Nickel (84)—Molybdenum (15)—Titanium (1) | 6.7 A/g |
| Raney Nickel-Molybdenum-Zirconium-Catalyst of Example 3 | 9.4 A/g |
| Raney Nickel-Molybdenum-Zirconium-Catalyst of Example 3, oxidized | 11.7 A/g |
| Raney Nickel-Molybdenum-Titanium-Catalyst of Example 5, oxidized | 17 A/g |

The Raney mixed catalysts according to the invention are suitable for pulverulent, for sintered, electrodes or for binder reinforced electrodes, all produced according to known methods. Thus, the catalysts may be processed for example, with pore producers, with carbon or with metals which are resistant to the electrolytes, particularly carbonyl nickel or synthetics such as polytetrafluorethylene. Also, their use is not restricted to the anodic oxidation of hydrogen or the precipitation of hydrogen or oxygen. They are well suited for the anodic oxidation of organic fuels such as methanol, formaldehyde, glycerine, etc. as well as the oxidation of $N_2H_4$. They may also be used for catalyzing hydrogenation reactions of organic substances.

The following examples will illustrate the invention in even greater detail:

EXAMPLE 1

An alloy of 7.5 percent molybdenum, 0.5 percent titanium, 42 percent nickel and 50 percent aluminum, was melted by eliminating air and broken up after slow cooling. Subsequently, the fraction with a grain size <50µ was screened out and leached at room temperature, with 6 n KOH. Thereafter, 5g of the washed catalyst were pressed with a nickel mesh into an electrode holder, having an electrode area of 12.5 cm². The diameter of the electrode was 4 cm and the thickness approximately 1.5 mm. The catalyst quantity was 400 mg per cm². The electrode was subsequently loaded in a half cell arrangement at room temperature, with 100 mA/cm², whereby the entire measured overvoltage was 110 mV.

Another test was conducted at room temperature with the catalyst amount of 50 mg/cm² and the loading 250 mA/cm². The measured overvoltage was 120 mV. The temperature rose to 37° C. The specific exchange current measured at this polarity was about 7.0 A/g. The specific exchange current of a Raney nickel molybdenum catalyst, comprising an alloy of 50 percent aluminum, 40 percent nickel and 10 percent molybdenum, in a comparison test was 5.5 A/g.

EXAMPLE 2

100 g of a Raney alloy of the composition in Example 1, was leached out following breaking up and fractionation, for 2 hours, with 6 n KOH, at 110° C. After repeated washing with potassium hydroxide solution and distilled water, the Raney mixed catalyst was suspended in 1,000 ml water and gradually compounded with 100 ml perhydrol. The suspension was maintained through intensive mixing and cooling at a temperature, not exceeding 60° C. After the entire amount of perhydrol (hydrogen peroxide) was added, the suspension was intensively mixed for another hour. The catalysts was then removed by vacuum, washed with distilled water and dried. The thus "conserved" mixed catalyst showed, after reduction by $H_2$, almost the same activity as prior to the $H_2O_2$ treatment, however its stability was greatly improved in this manner. An electrode which was coated with 400 mg/cm$^2$ of this catalyst, works for one year with 100 mA/cm$^2$, at a total overvoltage of 90 mV. The change in potential during the period of testing amounted to an average of 1$\mu$V/h. In a parallel test with a non-oxidized, that is a non-conserved, catalyst, showed a time-potential change of 15$\mu$V/h. The specific exchange current for this catalyst was approximately 6.7 A/g.

EXAMPLE 3

An alloy of 14.5 percent molybdenum, 36.5 percent nickel, 1 percent zirconium and 48 percent aluminum was melted as in the preceding example and homogenized through a 24 hour tempering process. Following a breaking up and fractionizing process, the specimen was leached at room temperature, with 6 n KOH. The specific exchange current of this catalyst was about 9.4 A/g.

EXAMPLE 4

100 g of the alloy from Example 3 was broken up after tempering, screened and leached out for 2 hours, at 110° C., with 6 n KOH and subsequently washed with a potassium hydroxide solution and distilled water. Thereafter, the catalyst was dried in an oven, by inert gas, at 100° C. and, following the cooling process slowly oxidized, through a careful added dosing of air to the inert gas (nitrogen). The temperature of the catalyst must not rise thereby above 100° C. The oxidation was finished after 8 hours and the catalyst delivered a specific exchange current of 11.7 A/g, following a 24 hour cathodic reaction with 100 mA.

EXAMPLE 5

An alloy of 20.4 percent molybdenum, 25.2 percent nickel, 1 percent titanium and 53.4 percent aluminum was molten as in the preceding examples. The melt was subsequently chilled and the solid alloy was tempered for 72 hours, at 800°C. After the breaking up and fractionation of the alloy, the aluminum was extracted with 6 n KOH. 100 g of the thus leached catalyst were suspended in 500 ml 6 n KOH and, under constant mixing, were slowly compounded with 150 ml perhydrol. The temperature was maintained below 60° C., by cooling with ice. Subsequently, the suspension was mixed for one more hour, the catalyst removed by suction, washed first in a KOH solution, then with water, and finally dried. In the arrangement of the known catalyst sieve electrode, this catalyst delivered, at a coating density of 500 mg/cm$^2$, with an electrolyte, comprising one-third methanol and two-thirds 10 n KOH, a current density of 82 mA/cm$^2$ at 820 mV with respect to the Hg/HgO electrode. The specific exchange current for the hydrogen oxidation amounts, in this catalyst, to 17 A/g.

We claim:
1. A Raney mixed catalyst comprising three active metals, said metals being nickel, molybdenum and a third metal selected from titanium and zirconium, the molybdenum content in said catalyst being 10 to 50 percent by weight, the titanium content, when present, being 0.5 to 5 percent by weight and the zirconium content, when present, being 1 to 12 percent by weight, the remainder being nickel, said catalyst being prepared from a Raney alloy, containing said three active metals and aluminum as an inactive metal, said alloy being at least partially in a homogeneous quarternary phase.

2. The Raney mixed catalyst of claim 1 comprising 45 to 89.5 percent by weight nickel, 10 to 50 percent by weight molybdenum and 0.5 to 5 percent by weight titanium.

3. The Raney mixed catalyst of claim 1 comprising 63.5 to 71 percent by weight nickel, 28.5 to 34.6 percent by weight molybdenum and 1 to 2 percent by weight titanium.

4. The Raney mixed catalyst of claim 1 comprising 69 to 70 percent by weight nickel, 29 percent by weight molybdenum and 1 to 2 percent by weight titanium.

5. The Raney mixed catalyst of claim 1 comprising 44 to 89 percent by weight nickel, 10 to 50 percent by weight molybdenum and 1 to 12 percent by weight zirconium.

6. The Raney mixed catalyst of claim 1 comprising 63.3 to 71.2 percent by weight nickel, 28 to 33.9 percent by weight molybdenum and 2 to 4 percent by weight zirconium.

7. The Raney mixed catalyst of claim 1 comprising 67 to 69 percent by weight nickel, 29 percent by weight molybdenum and 2 to 4 percent by weight zirconium.

8. The process for preparing a Raney mixed catalyst comprising three active metals, said metals being nickel, molybdenum and a third metal selected from titanium and zirconium which comprises forming a Raney alloy of aluminum, nickel, molybdenum and titanium or zirconium which consists, at least partially, of a homogeneous quarternary phase and dissolving out the aluminum from the alloy.

9. The process of claim 8, wherein the Raney alloy consists of at least 70 percent of a homogeneous quarternary phase.

10. The process of claim 8, wherein the Raney alloy is tempered before dissolving out the aluminum.

11. The process of claim 10, wherein the tempering is at a temperature of between 500° and 1,100° C.

12. The process of claim 8, wherein the Raney alloy is oxidized after the dissolution of aluminum.

13. The process of claim 12, wherein an electrochemical oxidation results from a polarization of 100 to 1,000 mV.

14. The process of claim 12, wherein an electrochemical oxidation results from a polarization of 100 to 150 mV.

15. The process of claim 12, wherein the oxidation means is selected from air, oxygen or hydrogen peroxide.

16. The process of claim 8, wherein the Raney alloy consists of 48 to 58 percent aluminum, 5 to 25 percent molybdenum, 20 to 45 percent nickel and 0.25 to 2.5 percent titanium.

17. The process of claim 16 wherein the Raney alloy consists of at least 70 percent of a homogeneous quarternary phase and contains 52 to 56 percent aluminum, 18 to 22 percent molybdenum, 23 to 27 percent nickel and 0.5 to 1.0 percent titanium.

18. The process of claim 17, wherein the Raney alloy is completely of a quarternary homogeneous phase and contains 53.4 percent aluminum, 20.4 percent molybdenum, 25.2 percent nickel and 1 percent titanium.

19. The process of claim 8, wherein the Raney alloy consists of 48 to 58 percent aluminum, 5 to 25 percent molybdenum, 20 to 45 percent nickel and 0.5 to 6 percent zirconium.

20. The process of claim 19, wherein the Raney alloy consists of at least 70 percent of a homogeneous quarternary phase and contains 52 to 56 percent aluminum, 18 to 22 percent molybdenum, 23 to 27 percent nickel and 1 to 2 percent zirconium.

21. The process of claim 20, wherein the Raney alloy is completely of a quarternary phase and contains 52.9 percent aluminum, 20.2 percent molybdenum, 24.9 percent nickel and 2 percent zirconium.

* * * * *